3,080,340
ESTERS OF UNSATURATED FATTY ACIDS AND
2,4-DIHYDROXY BENZOPHENONE
Carl B. Havens, Midland, and Ronald G. Brookens, Auburn, Mich., assignors to The Dow Chemical Company, Midland, Mich., a corporation of Delaware
No Drawing. Filed Jan. 19, 1960, Ser. No. 3,266
5 Claims. (Cl. 260—45.85)

This invention relates to new organic compounds and to polymeric compositions containing the same. More particularly, it relates to unsaturated fatty acid esters of 2,4-dihydroxy benzophenone and to polymeric compositions stabilized with the same.

Many polymers, such as haloethylene polymers, are subject to rapid and severe degradation and consequent discoloration upon exposure to sunlight. To overcome that disadvantage, it has been found necessary to incorporate certain additives into compositions containing such polymers. Various compounds having a benzophenone nucleus have been known to have utility as light stabilizers in such compositions. Several of those compounds, however, are odoriferous and volatile. Any odor in the stabilizer will be transferred to the stabilized composition, thus greatly reducing the merchandisability of any article prepared from the composition. Also, a volatile ingredient in a polymeric composition will gradually volatilize out of the composition leaving the composition unprotected.

Such compounds vary in their effectiveness for absorbing ultraviolet light and vary in their compatibility with the polymer employed in the composition. Thus, it is impossible to predict the effectiveness of any particular compound as a light stabilizer for any given polymer.

It is accordingly the principal object of this invention to provide a new group of organic compounds having the stated utility.

It is a further object to provide polymeric compositions stabilized against the degradative effects of light by means of such compounds.

The above and related objects are accomplished by means of 4-mono esters of 2,4-dihydroxy benzophenones and unsaturated fatty acids having the following general formula:

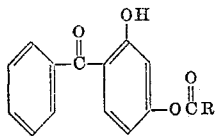

wherein R is an unsaturated aliphatic group containing from 5 to 17 carbon atoms and by means of compositions comprising such compounds together with organic synthetic polymers normally subject to discoloration on exposure to light.

The esters are prepared by the reaction of 4-benzoyl resorcinol with an unsaturated fatty acid chloride. As a typical example of their preparation, the procedure for preparing 9,12-octadecadienoic acid; 2,4-dihydroxy benzophenone, 4-mono ester will be described. A reaction mixture consisting of 149.3 grams of linoleic acid chloride, 107 grams of 4-benzoyl resorcinol in 500 ml. toluene and 75 ml. pyridine was heated for two hours at 75–80° C. After successive washing with dilute HCl, 5.0 percent sodium bicarbonate and water, the solvent was removed by distillation under a reduced pressure of 30–35 mm. Hg. The product was a light yellow semi-solid having an iodine No. of 84.0. Other esters within the scope of the above general formula may be prepared by choosing the desired unsaturated fatty acid chloride and conducting the reaction in solvents, such as toluene, in the presence of esterification catalysts such as pyridine. Typical esters prepared in this manner are:

2,4-hexadienoic acid; 2,4-dihydroxy benzophenone 4-mono ester
9-octadecenoic acid; 2,4-dihydroxy benzophenone 4-mono ester
9,12,15-octadecatrienoic acid; 2,4-dihydroxy benzophenone 4-mono ester The compounds were evaluated as light stabilizers for haloethylene and other polymers. Because of their low odor level they produced compositions which were more mechandisable than compositions prepared from previous stabilizers. In addition, their low volatility caused a more permanent stabilization than prior compounds.

As light stabilizers, the compounds may be employed in an amount of from 0.5 to 10 percent by weight based on the weight of the polymer employed. It is possible to use the compounds in conjunction with other known stabilizers.

The compounds of this invention have been found to be particularly effective in stabilizing polymers and copolymers of vinylidene chloride. They have also been found effective in stabilizing polyesters, polyamides, polyolefins and polyacrylonitriles against the degradative effects of light.

The effectiveness of the stabilizing compounds of this invention will be more apparent from the following illustrative examples in which all parts and percentages are by weight.

*Example I*

A series of samples was prepared from a basic formulation consisting of 91.5 parts of a copolymer prepared from 85 percent vinylidene chloride and 15 percent vinyl chloride, 7 parts of a pentaerythritol tetraester of saturated fatty acids having 8–10 carbon atoms as a plasticizer, 0.5 part of disodium lauryl phosphate as a heat stabilizer, 0.5 part of sodium tripolyphosphate as a heat stabilizer and 0.5 part of sorbitan monostearate. One group of samples were left as blanks for comparison. To another group of samples was added one part of 9,12-octadecadienoic acid; 2,4-dihydroxy benzophenone, 4-mono ester. The samples were compression molded to form sheets 0.005 inch thick. The moldings were exposed under General Electric RSI sunlamps. The extent of browning was rated according to color standards ranging from 0 (no browning) to 12 (dark brown). The hours of useful life based on the time required to reach a standard color change of six was determined. The results are listed in the following table.

| Compound: | Hours of useful life |
|---|---|
| 9,12-octadecadienoic acid; 2,4-dihydroxy benbophenone, 4-mono ester | 36 |
| Blank | 16 |

Additional thermoplastic polymeric compositions stabilized with the compounds of the invention illustrated by the following examples:

*Example II*

| Poly(hexamethylene adipamide) | 97.5 |
|---|---|
| 2,4-hexadienoic acid; 2,4-dihydroxy benzophenone 4-mono ester | 2.5 |

*Example III*

| Polystyrene | 98.5 |
|---|---|
| 9,12,15-octadecatrienoic acid; 2,4-dihydroxy benzophenone 4-mono ester | 1.5 |

The compositions of Examples II and III exhibited much greater stability against discoloration by ultraviolet light than did the unstabilized polymers.

We claim:
1. As a new organic compound, a 4-mono ester of 2,4-dihydroxy benzophenone and an unsaturated fatty acid having the general formula:

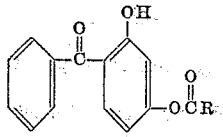

wherein R is a polyunsaturated aliphatic group containing from 5 to 17 carbon atoms.

2. The 4-mono ester of 2,4-dihydroxy benzophenone and 9,12-octadecadienoic acid.

3. A composition comprising an organic synthetic polymeric material normally subject to discoloration on exposure to light and from 0.5 to 10 percent of the weight of said polymeric material of a 4-mono ester of 2,4-dihydroxy benzophenone and an unsaturated fatty acid having the general formula:

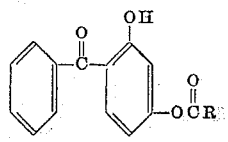

wherein R is a polyunsaturated aliphatic group containing from 5 to 17 carbon atoms.

4. The composition claimed in claim 3 wherein the polymeric material is a haloethylene polymer.

5. A composition comprising a haloethylene polymer and from 0.5 to 10 percent of the weight of said polymer of the 4-mono ester of 2,4-dihydroxy benzophenone and 9,12-octadecadienoic acid.

References Cited in the file of this patent
UNITED STATES PATENTS

| | | |
|---|---|---|
| 2,575,440 | Bradley | Nov. 20, 1951 |
| 2,894,022 | Havens et al. | July 7, 1959 |
| 2,898,323 | Clark | Aug. 4, 1959 |
| 2,938,883 | Raich | May 31, 1960 |
| 2,980,647 | Lappin | Apr. 18, 1961 |